US 6,586,070 B1

(12) United States Patent
Dai et al.

(10) Patent No.: US 6,586,070 B1
(45) Date of Patent: Jul. 1, 2003

(54) THIN FILM TISI$_x$N$_Y$ PROTECTIVE LAYER

(75) Inventors: Qing Dai, San Jose, CA (US); Bruno Marchon, Palo Alto, CA (US); Michael Andrew Scarpulla, San Jose, CA (US); Richard Longstreth White, Los Altos, CA (US); Bing K. Yen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/119,328

(22) Filed: Apr. 8, 2002

(51) Int. Cl.$^7$ .................................................. G11B 5/72
(52) U.S. Cl. ............................. 428/65.5; 428/694 TP; 204/192.15; 204/192.16
(58) Field of Search .......................... 428/65.5, 694 TP; 204/192.15, 192.16

(56) References Cited

U.S. PATENT DOCUMENTS 4,761,334 A  *  8/1988  Sagoi et al. ................. 428/332
5,403,458 A  *  4/1995  Hartig et al. .......... 204/192.15

* cited by examiner

*Primary Examiner*—Stevan A. Resan
(74) *Attorney, Agent, or Firm*—G. Marlin Knight

(57) ABSTRACT

A overcoat layer of TiSi$_x$N$_y$ for use on a magnetic thin film disk is disclosed. The overcoat of the invention has high hardness, provides corrosion protection and has low surface energy which reduces contaminant attraction. The TiSi$_x$N$_y$ film is conductive and, therefore, reduces the deleterious effects of tribocharging.

21 Claims, 5 Drawing Sheets

THIN FILM TISI$_x$N$_Y$ PROTECTIVE LAYER

FIELD OF THE INVENTION

The invention relates to materials useful as thin film protective layers and more particularly to thin film films comprising TiSi$_x$N$_y$ and even more particularly to such films as used on thin film magnetic media.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head", is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The thin film protective layer (not shown in FIG. 1) is typically the last or outermost layer.

The conventional disk 16 typically has a substrate 26 of AlMg/NiP or glass. The thin films 21 on the disk 16 typically include a chromium or chromium alloy underlayer that is deposited on the substrate 26. The magnetic layer in the thin films 21 is based on various alloys of cobalt, nickel and iron. For example, a commonly used alloy is CoPtCr. However, additional elements such as tantalum and boron are often used in the magnetic alloy.

FIG. 2 illustrates one common internal structure of thin films 21 on disk 16. The protective overcoat layer 37 is used to improve wearability and corrosion resistance. The materials and/or compositions which are optimized for one performance characteristic of an overcoat are rarely optimized for others. The most commonly used protective layer materials for commercial thin film disks have been carbon, hydrogenated carbon (CH$_x$), nitrogenated carbon (CN$_x$) and CN$_x$H$_y$. The overcoat on a thin film magnetic disk is subjected to an environment that is quite different from that of a thin film layer in a semiconductor device. The overcoat on a magnetic disk is an integral part of a mechanical system and is thereby subjected to physical impact by the head, contamination by contact with the atmosphere and electrostatic effects caused by intermittant rubbing with the head, i.e., tribocharging. In order to improve the performance of magnetic thin film media the protective overcoat 37 must be made as thin as possible to reduce the separation from the magnetic transducer 20 and the magnetic thin film 33 while maintaining the protective function.

In U.S. Pat. No. 4,761,334 Sagoi, et al., describe the use of SiN$_x$ as an overcoat layer for a magnetic thin film disk. Sagoi asserts that silicon oxide, aluminum oxide, titanium nitride make brittle overcoats which are prone to excessive wear from contact with the head. U.S. Pat. No. 6,136,421 to Chen describes the use of silicon nitride oxide as part of a bilayer overcoat which has a layer of amorphous carbonaceous layer over it.

SUMMARY OF THE INVENTION

The applicants disclose a overcoat layer of TiSi$_x$N$_y$ for use on a magnetic thin film disk. The overcoat of the invention has high hardness, provides corrosion protection and has low surface energy which reduces contaminant attraction. The TiSi$_x$N$_y$ film is conductive and, therefore, reduces the deleterious effects of tribocharging.

DETAILED DESCRIPTION OF THE INVENTION AND PREFERRED EMBODIMENTS

Figure 1:
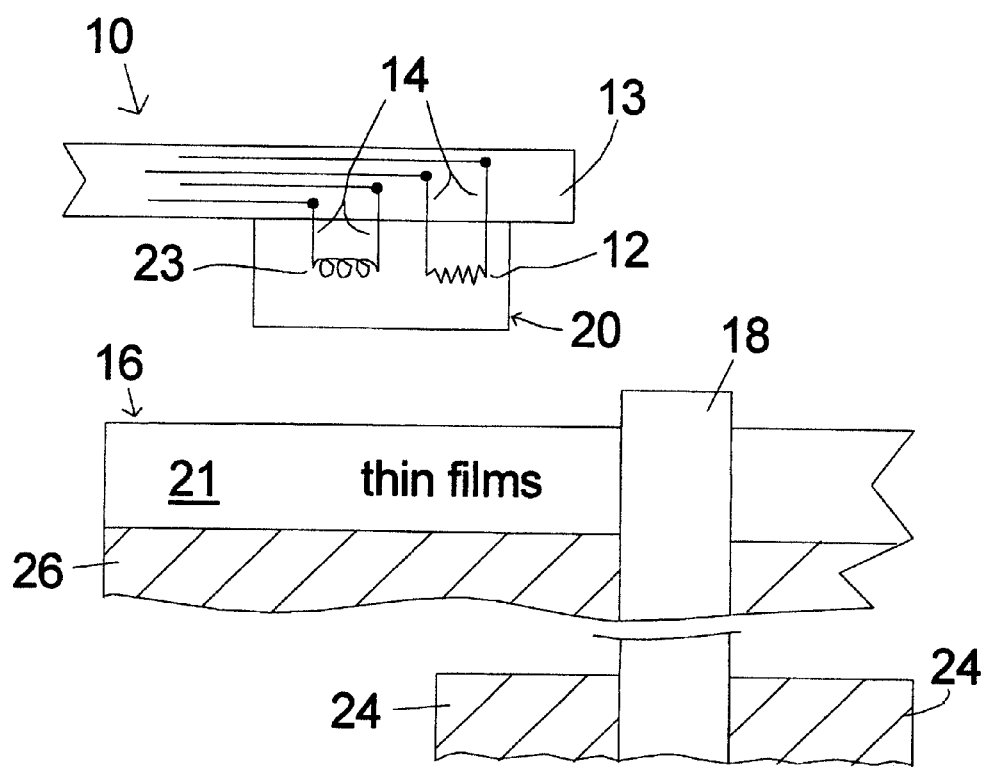
FIG. 1 is a symbolic illustration of the prior art showing the relationships between the head and associated components in a disk drive.
Figure 2:
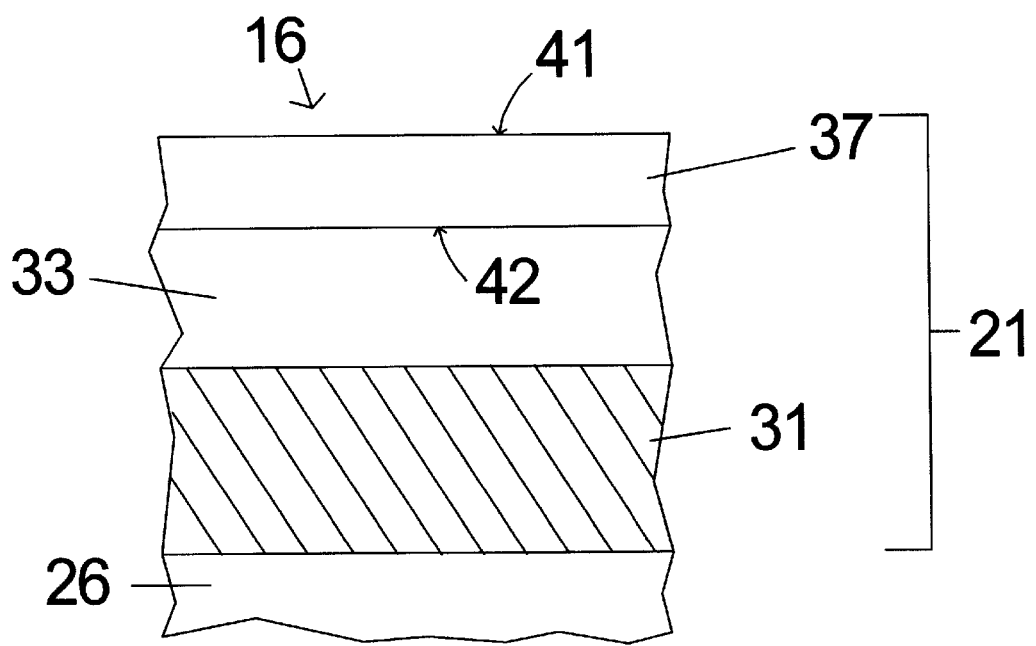
FIG. 2 is an illustration of a layer structure for a magnetic thin film disk according to the invention.

The protective layer of the invention can be used with any combination of underlying films on a magnetic thin film disk. FIG. 2 illustrates one prior art thin film structure of a magnetic thin film disk in which the TiSi$_x$N$_y$ layer according to the invention can be used. The film structure illustrated contains only one magnetic layer 33 and one underlayer 31. However, the protective layer structure of the invention is not dependent on any particular underlying film structure. The protective layer of the invention, therefore, may be used on any combination of multiple magnetic layers, underlayers and seed layers.

The structure of sputtered TiSi$_x$N$_y$ has been found to consist of nanocrystalline TiN$_x$ in an amorphous matrix. This distinguishes TiSi$_x$N$_y$ over all previous overcoat materials-in that they are amorphous. It also distinguishes TiSi$_x$N$_y$ over crystalline films such as ZrN and NbN. The amorphous matrix is believed to consist primarily of SiN$_x$ with the possibility of small amounts of titanium occurring therein.

The typical magnetic films used in prior art disks contain significant amounts of chromium. One side effect of this is that the chromium provides some protection from corrosion. Future magnetic films may not contain chromium for reasons which are outside the scope of this application. Without chromium these films will be expected to have a higher susceptibility to corrosion. The TiSi$_x$N$_y$ film of the invention should be particularly useful in preventing corrosion in these films.

Figure 3:
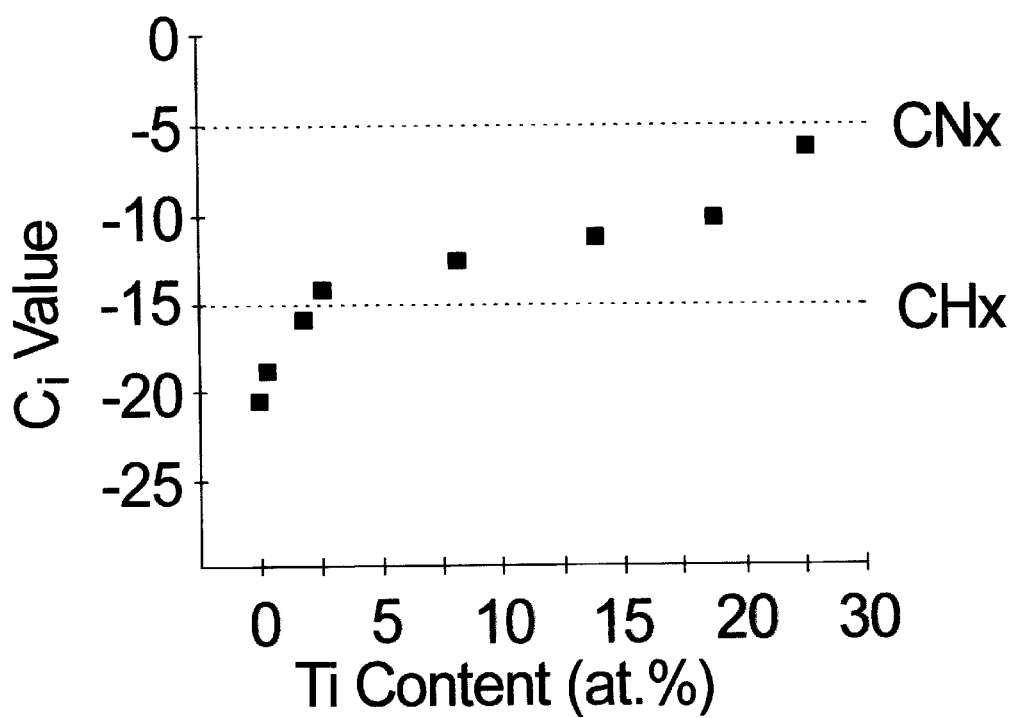
FIG. 3 is a graph showing the relationship between conductance and titanium content in TiSi$_x$N$_y$.

In comparison to the prior art SiN$_x$ overcoat the TiSi$_x$N$_y$ overcoat has significantly higher conductance. FIG. 3 shows a graph of the measured conductance in TiSi$_x$N$_y$ with various atomic percentages of titanium. The vertical scale is the $C_i$ value which is a measure of the probe-overcoat-magnetic layer junction exchange current ($e^{ci}$) and is roughly proportional the log of electrical conductivity. As the titanium content increases from zero (SiN$_x$) the material goes from an insulator to being a good conductor. The $C_i$ value is seen to increase with increases in titanium content. The comparable values for typical CN$_x$ and CH$_x$ films are also shown for comparison. The data show that values of 5–25 at. % titanium in TiSi$_x$N$_y$ result in currents between CN$_x$ and CH$_x$ films.

Figure 4:
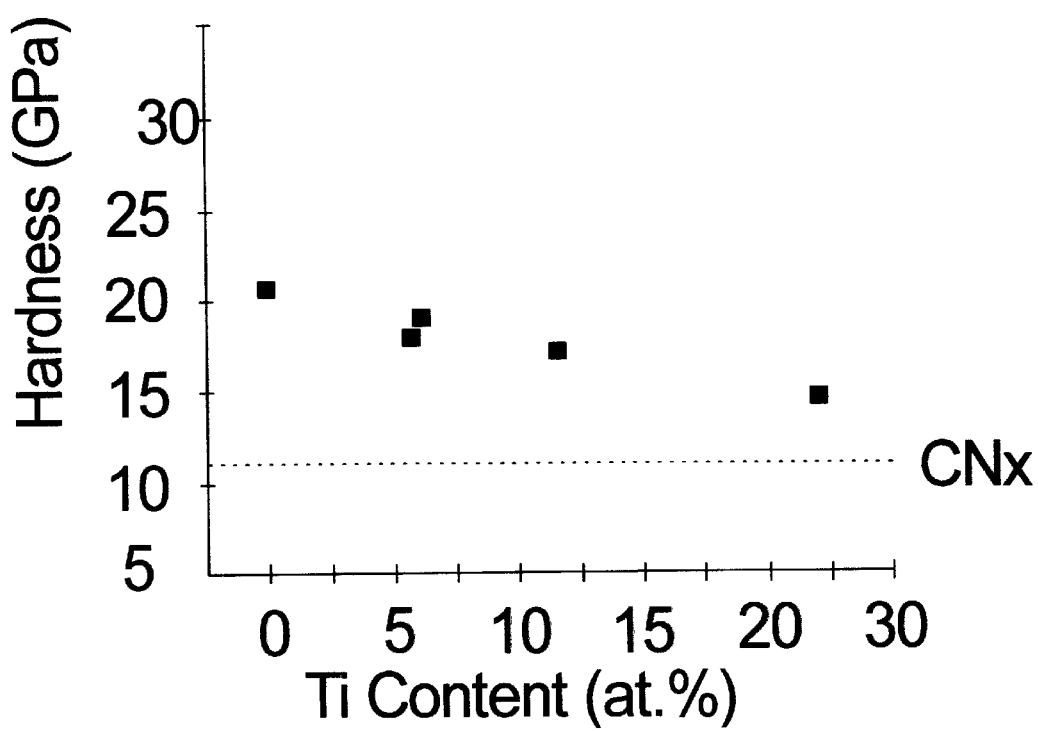
FIG. 4 is a graph of hardness versus titanium content for TiSi$_x$N$_y$.

FIG. 4 shows a graph of the measured hardness of $TiSi_xN_y$ with various atomic percentages of titanium. Each of these films was 1200 Angstroms thick. Although the hardness is seen to decrease with increasing titanium content, in the range from zero to 30 at. % the hardness is above that of $CN_x$ which is shown on the graph.

The $TiSi_xN_y$ film is superior to either $SiN_x$ or $CN_x$ in that it has high hardness, low electrical resistance and low surface energy. Table 1 gives some data for comparison. Although $SiN_x$ is somewhat harder than $TiSi_xN_y$, $TiSi_xN_y$ is much harder than $CN_x$, but $TiSi_xN_y$ results in lower polar surface energy when used in conjunction with a typical lubricant of the type used on magnetic disks. $TiSi_xN_y$ also has much lower electrical resistance than $SiN_x$. Considering all of these factors, the overall performance of $TiSi_xN_y$ is superior.

The preferred method of depositing the $TiSi_xN_y$ protective layer of the invention is by DC sputtering using known techniques. RF sputtering may also be used. In the typical process for forming a $TiSi_xN_y$ film a target containing silicon and titanium (titanium silicide) is used and nitrogen is introduced into the sputtering chamber as a gas. Co-sputtering may also be used with separate titanium and silicon targets.

The preferred embodiment of the film of invention has a nitrogen composition range from approximately 45 to 55 at. % with 50 at. % being even more preferred. The nitrogen content of the film is controlled by the partial pressure of nitrogen gas in the chamber with higher partial pressures generally resulting in higher nitrogen content in the film. As is standard in the art the partial pressure of nitrogen which will result in the desired nitrogen content in the film is set by empirical testing for each type of sputtering system.

The titanium content should preferably be from about 2.5 to 30 at. %. As FIG. 3 indicates if the titanium content drops below 2.5 at. % the electrical conductance goes below that of $CH_x$. At the upper limit titanium content begins to degrade the corrosion protection when used at the thicknesses required for magnetic disks. The preferred composition of $TiSi_xN_y$ is titanium from 2.5 to 30 at. %, silicon from 15 to 52.5 at. % silicon and nitrogen from 45 to 55 at. %. The ratio of titanium to silicon in the film is approximately the same as the ratio of these elements in the sputtering target(s). An even more preferred range for titanium content is 15 to 25 at. %.

Figure 5:
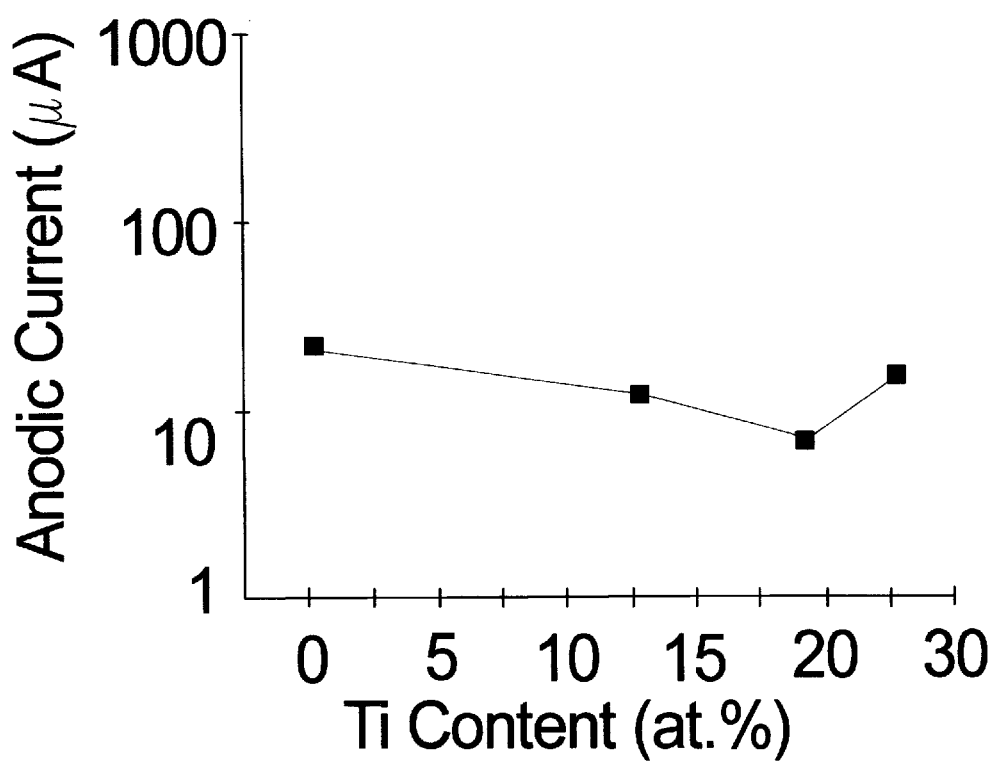
FIG. 5 is a graph of porosity versus titanium content for TiSi$_x$N$_y$.

FIG. 5 is a graph of titanium content versus anodic corrosion current which is a way of estimating porosity. Lower values of porosity are preferred for protective layers to lower the corrosion currents. The data show that a local minimum of anodic current (porosity) occurs between 13 at. % titanium and 26 at. % with approximately 19 at. % resulting in the lowest porosity.

The thickness of an overcoat for a magnetic disk is limited on the upper side by the required distance between the magnetic layer(s) and the read/write transducer. Since thicker overcoats provide better corrosion and impact protection, the optimal overcoat thickness is ultimately dictated by the design requirements of the storage device. For a typical disk design, the preferred thickness of the protective layer is expected to be from 15 to 50 Angstroms.

TABLE 1

|  | $CN_x$ | $SiN_x$ | $TiSi_xN_y$ |
|---|---|---|---|
| Hardness (GPa) | 12 | 25 | 20 |
| Resistivity (Ω-cm) | 0.1 | $10^9$ to $10^{12}$ | 0.1 to $10^4$ |
| Surface Energy with lubricant (ergs/cm²) | 7 | 17.5 | 6.7 |

The atomic percent compositions given above are given without regard for the small amounts of contamination that invariably exist in sputtered thin films as is well known to those skilled in the art.

The invention has been described with respect to use on thin film magnetic disks, but other uses and applications which can benefit from the properties of the protective layer structure of the invention will be apparent to those skilled in the art.

What is claimed is:

1. A magnetic disk with a thin film layer structure comprising:

a magnetic thin film; and a $TiSi_xN_y$ protective layer formed on the magnetic thin film where X is from about 15 to 55 at. %, Y is about 45 to 55 at. % and the remainder being titanium.

2. The disk of claim 1 wherein the atomic percentage of titanium is from about 2.5 to 25 at. %.

3. The disk of claim 1 wherein the protective layer is from about 15 to 50 Angstroms thick.

4. The disk of claim 1 wherein the magnetic thin film is an alloy of cobalt containing no chromium.

5. The disk of claim 1 wherein the atomic percentage of nitrogen Y is about 50%.

6. The disk of claim 1 wherein protective layer is conductive.

7. A method of depositing thin films comprising the steps of:

placing one or more targets containing titanium and silicon in a sputtering chamber;

introducing nitrogen gas into the sputtering chamber; and sputter depositing a thin film of $TiSi_xN_y$ as a protective layer onto an article having at least one magnetic thin film.

8. The method of claim 7 wherein in the thin film of $TiSi_xN_y$, X is from about 15 to 55 at. %, Y is about 45 to 55 at. % and the remainder being titanium.

9. The method of claim 7 wherein the atomic percentage of titanium is from about 2.5 to 25 at. %.

10. The method of claim 7 wherein the protective layer is from about 15 to 50 Angstroms thick.

11. The method of claim 7 wherein the magnetic thin film is an alloy of cobalt containing no chromium.

12. The method of claim 7 wherein the atomic percentage of nitrogen Y is about 50%.

13. The method of claim 7 wherein the protective layer is conductive.

14. A disk drive comprising:

a magnetic transducer including a read and a write head for reading and writing magnetic transitions;

a spindle; and a thin film disk mounted on the spindle to rotate in a confronting position in relation to the magnetic transducer, the thin film disk including magnetic material in which the magnetic transducer writes magnetic transitions; and a protective layer comprising $TiSi_xN_y$ over the magnetic material.

15. The disk drive of claim 14 wherein the atomic percentage of nitrogen Y in the overcoat is from about 45 to 55 at. %.

16. The disk drive of claim 14 wherein the atomic percentage of titanium is from about 2.5 to 30 at. %.

17. The disk drive of claim 14 wherein the atomic percentage of silicon X is about 15 to 55 at. %.

18. The disk drive of claim 14 wherein the protective layer is from about 15 to 50 Angstroms thick.

19. The disk drive of claim 14 wherein the magnetic thin film is an alloy of cobalt containing no chromium.

20. The disk drive of claim 14 wherein the protective layer is conductive.

21. The disk drive of claim 14 wherein the protective layer is nanocrystalline $TiN_x$ in an amorphous matrix consisting primarily of $SiN_x$.

* * * * *